UNITED STATES PATENT OFFICE.

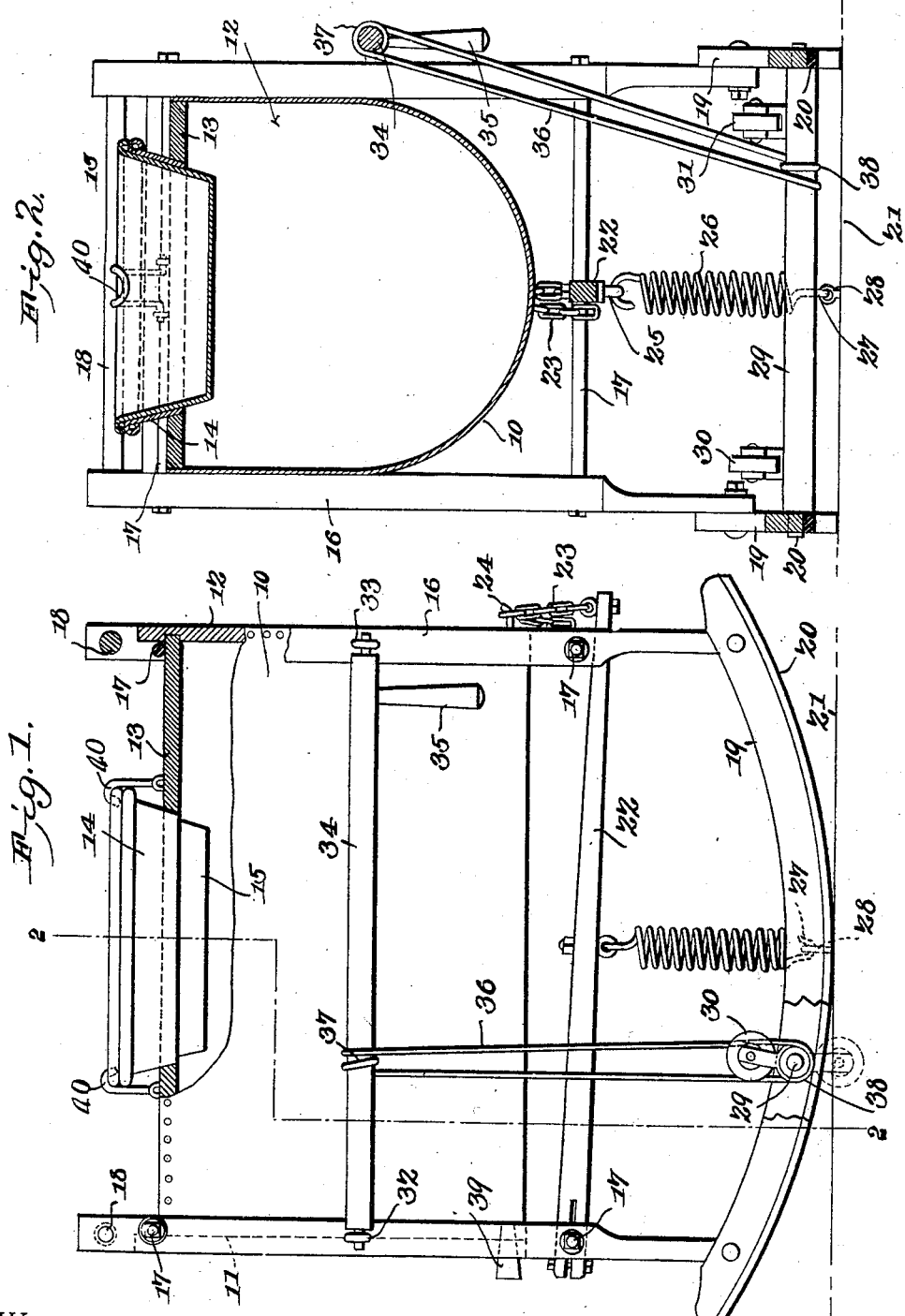

LABAN SOSEMAN, OF EVANS, IOWA.

CHURN.

No. 835,568.

Specification of Letters Patent.

Patented Nov. 13, 1906.

Application filed February 27, 1906. Serial No. 303,248.

*To all whom it may concern:*

Be it known that I, LABAN SOSEMAN, a citizen of the United States, residing at Evans, in the county of Mahaska and State of Iowa, have invented a new and useful Churn, of which the following is a specification.

This invention relates to churns, and has for its object to improve the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a side elevation partly in section. Fig. 2 is a vertical section on the line 2 2 of Fig. 1.

The improved device comprises a body or receptacle for the milk formed with sheet-metal sides and bottom 10, wooden ends 11 12, and wooden top 13, the bottom being preferably curved in semicylindrical form, as shown in Fig. 2.

The receptacle is provided with an aperture in its top member 13, and disposed in this aperture is an inclined rim or lining 14, and fitting in this lining is a closure 15 with correspondingly-inclined sides and depending below the lower line of the top 13 and the lining 14, thus forming a "baffle" to break up the mass of milk as it flows back and forth under the action of the churn, as hereinafter explained. The receptacle is supported by standards 16, clamped thereto by tie-rods 17, and with "rounds" 18 at the ends to serve as handles with which to operate the device.

The standards 16 are mounted upon rockers 19, the latter having rubber or other bearing-faces, as at 20, to prevent the device from "creeping" upon the floor (represented at 21) while being operated.

Swinging at one end from one of the rods 17 is a lever 22 and adjustable vertically at the other end by a chain 23, adapted to be engaged link by link with a pin 24 on the adjacent end of the receptacle. Attached at 25 to the lever 22 is a spring 26, the opposite end of the spring having a hook 27 for detachably engaging an eye 28 in the floor 21. The spring exerts its force to retain the receptacle in a central position upon its rockers and to return it automatically to its central position during the rocking movements.

Rotatively disposed between the rockers 19 is a roller 29, and connected to this roller are spaced caster-wheels 30 31, the caster-wheels adapted to bear upon the floor 21 and support the device above the floor when the roller is disposed in one position, as indicated by dotted lines in Fig. 1, and to be held above the floor and out of action when the roller is in another position, as shown in full lines in Figs. 1 and 2. Thus when it is desired to move the churn from place to place the hook 27 is detached from the eye 28 and the roller 29 turned until the wheels 30 31 are in their downward position, when the device may be easily moved to any desired point.

Mounted for oscillation in bearings 32 33 on two of the standards 16 is a roller 34, having an operating-arm 35 and over which an endless cord 36 is coiled at 37, the cord also passing around the roller 29, as at 37. By this arrangement when the arm 35 is in its downward position, as in Figs. 1 and 2, the roller 29 will be held with the wheels 30 31 in their upward or inoperative position, and when the position of the arm is reversed the position of the rollers will likewise be reversed under the action of the endless cord, as will be obvious.

A draw-off plug or other suitable means for the discharge of the buttermilk and cleansing-water will be employed, as indicated at 39.

The closure member 15 is provided with catches 40 to prevent displacement during the churning action. By this arrangement as the receptacle is rocked to and fro the milk is violently thrown back and forth from end to end and along the under side of the top 13 and against the depending portion of the closure 15, the latter thus serving as a baffle or retarder to break up the currents and materially increase the agitation and efficiency of the operation.

The force of the spring 26 materially reduces the labor of operating the churn, and the strength or tension of the spring may be readily adapted to the amount of milk or the strength of the operator.

The receptacle may be of any size or capacity required and of any suitable material.

Having thus described the invention, what is claimed is—

1. In a churn, a receptacle mounted upon rockers, a lever swinging at one end from said receptacle, means for adjusting said lever at the other end, and a spring connected between said lever and the floor upon which the rockers bear.

2. In a churn, a receptacle mounted upon rockers, a lever swinging at one end from said receptacle, a chain connected at one end to the free end of said lever and adapted to be detachably coupled link by link to a pin on the receptacle, and a spring connected between said lever and the floor upon which the rockers bear.

3. In a churn, a receptacle mounted upon rockers and having an aperture for the insertion of the milk, a closure to said aperture with a portion depending into the receptacle, a lever swinging at one end from said receptacle and adjustable at the free end relative to the receptacle, and a spring between the lever and the floor upon which the rockers bear.

4. In a churn, a receptacle mounted upon spaced rockers, a roller between said rockers, carrier-wheels upon said roller, and means for adjusting said roller to cause said wheels to engage the floor upon which the rockers bear, or be disposed above the same.

5. In a churn, a receptacle mounted upon spaced rockers, a roller between said rockers, carrier-wheels upon said roller, a roller mounted for oscillation upon said receptacle, and an endless cord extending around said rollers, whereby the wheel carrying the roller may be operated.

In testimony that I claim the foregoing as my own I have hereto affixed my signature in the presence of two witnesses.

LABAN SOSEMAN.

Witnesses:
J. B. MUIR,
JOSEPH BOYD.